Oct. 28, 1952 R. D. BEARUP 2,615,479
WOODSAWING MACHINE AND SHAPER ATTACHMENT THEREFOR
Filed June 14, 1948 3 Sheets-Sheet 1
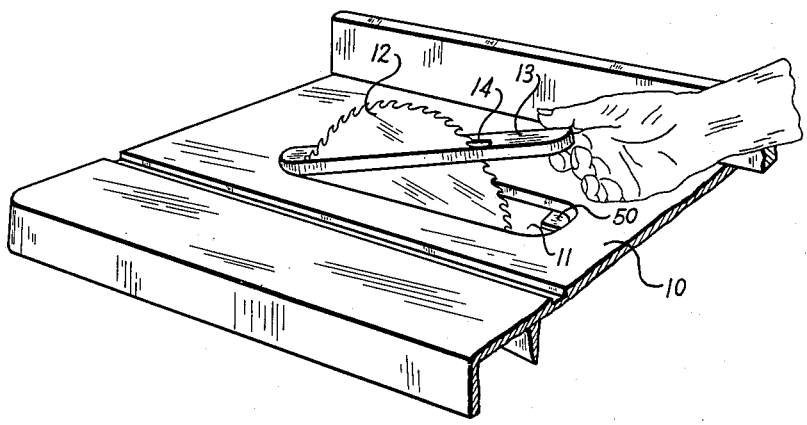
FIG.—1
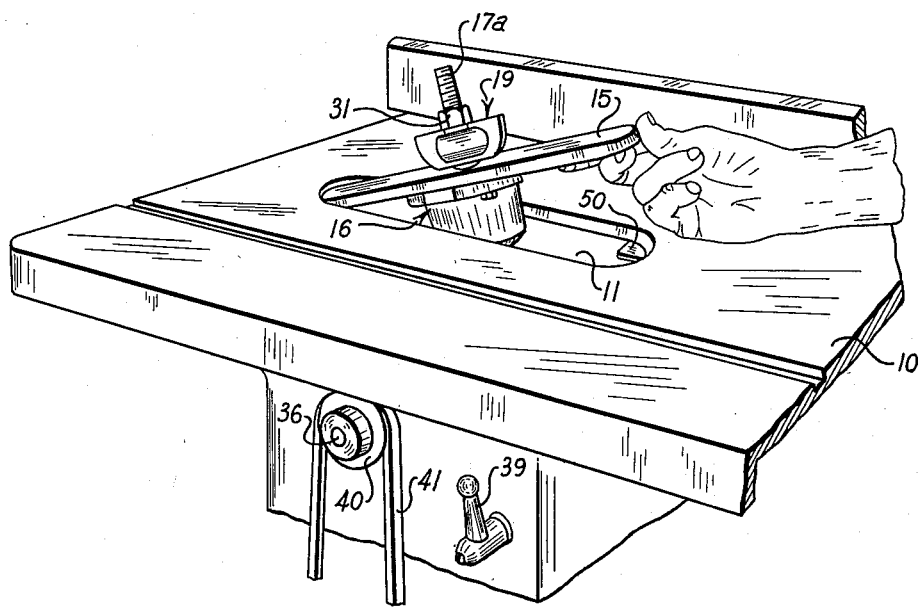
FIG.—2
INVENTOR.
Roswell D. Bearup
BY
*H. A. McGrew*
ATTORNEY Oct. 28, 1952          R. D. BEARUP          2,615,479

WOODSAWING MACHINE AND SHAPER ATTACHMENT THEREFOR

Filed June 14, 1948          3 Sheets-Sheet 2

INVENTOR.
Roswell D. Bearup
BY
ATTORNEY

Oct. 28, 1952  R. D. BEARUP  2,615,479
WOODSAWING MACHINE AND SHAPER ATTACHMENT THEREFOR
Filed June 14, 1948  3 Sheets-Sheet 3
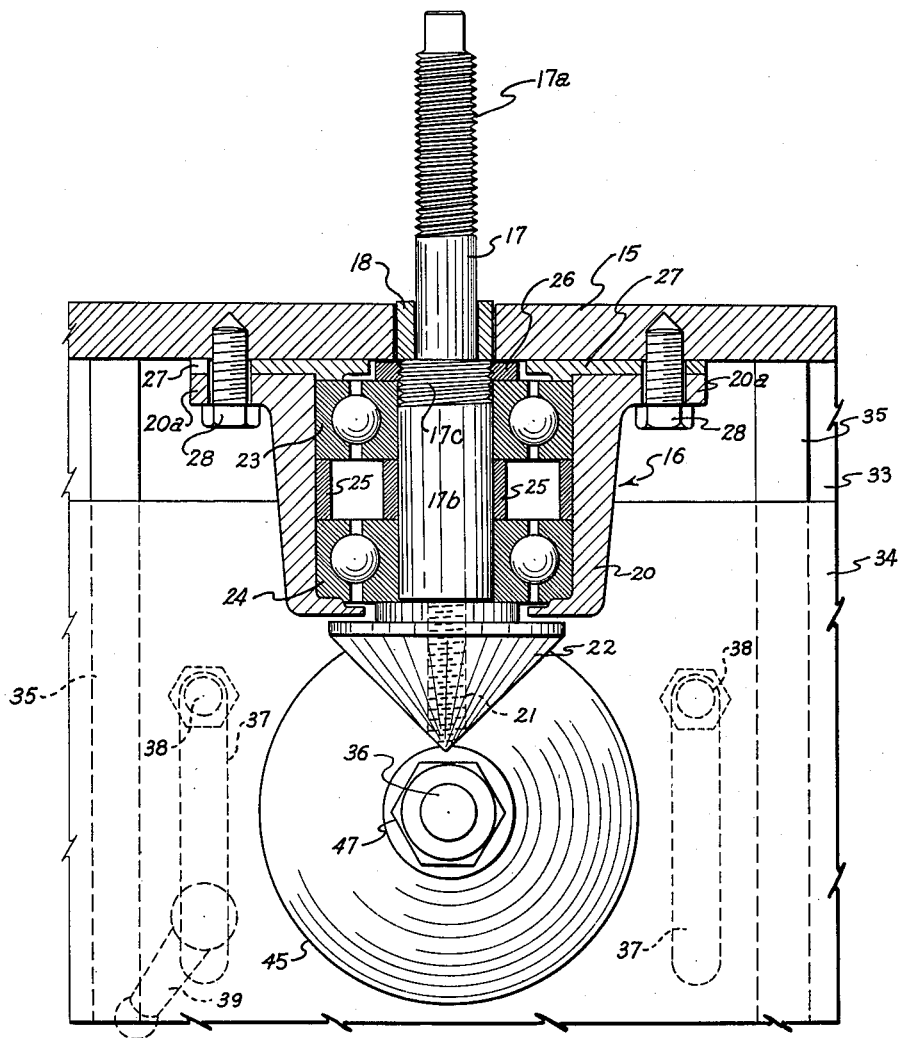
FIG.— 5
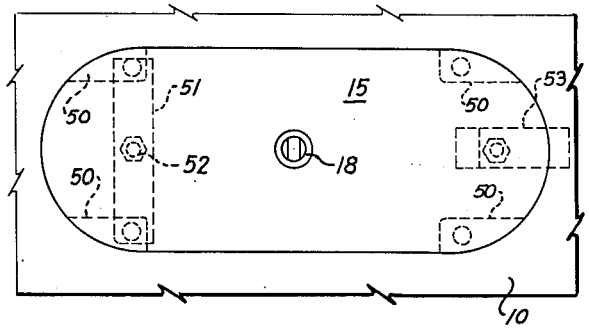
FIG.— 6
INVENTOR.
Roswell D. Bearup
BY
ATTORNEY

UNITED STATES PATENT OFFICE 2,615,479

WOODSAWING MACHINE AND SHAPER ATTACHMENT THEREFOR

Roswell D. Bearup, Colorado Springs, Colo.

Application June 14, 1948, Serial No. 32,831

9 Claims. (Cl. 144—1)

The present invention relates to woodsawing machine and shaper attachment therefor. It has to do particularly, although not exclusively, with a woodworking machine or apparatus which is convertible from a table type saw to a table type shaper, and vice versa.

In the prior art, there are examples of woodworking machines or apparatus having rotatable or revolvable heads carrying tools of different descriptions which supposedly can be brought into operative position to perform certain and different operations in woodworking. Such machines or apparatus have not been entirely satisfactory and have been extremely costly to manufacture. There are, of course, in the prior art, numerous separate machines serving as either table type saws or table type shapers, but with such it has been necessary for a shop to be equipped with two separate machines, namely a table saw and a table shaped so that both sawing and shaping operations could be performed. This did not only involve double expense for the purchase of equipment but also required practically double floor space for such equipment. In lieu of the purchase of two separate machines, it was necessary to purchase one of the combined machines briefly referred to above which, as stated, were not wholly satisfactory and are extremely expensive.

It is, therefore, one of the important objects of the present invention to provide a machine or apparatus or an attachment for a standard table type saw, whereby said saw may be quickly and easily converted into a shaper, this without requiring any rebuilding or reorganizing of the parts of the standard table saw.

Another object of the present invention is to provide an improved shaper assembly for application to a table type saw, in which the assembly includes improved power-driven means adapted to cooperate with improved driving means for the machine to drive the shaper at high speed in a substantially vibrationless manner.

A further object of the present invention is to provide a machine including a removable shaper assembly having an improved type of cone-like driving means, in which the cone is of built-up nature, having a body portion of non-metallic material which is cushioned from the driving shaft upon which it is mounted by improved rubber cushioning means; and one in which friction driving and driven means are provided.

Another and also important object of the present invention is to provide an improved attachment or assembly of the foregoing nature which may be quickly and readily applied to a standard table type saw and which may be purchased at relatively low cost, thus permitting a standard table type saw to serve the dual function of a saw and of a woodworking shaper.

The foregoing and other objects and advantages of the present invention will appear from the following description and appended claims when considered in connection with the accompanying drawings forming a part of this specification wherein like reference characters designate corresponding parts in the several views.

In said drawings:

Fig. 1 is a fragmentary perspective view of the table of a table power-driven saw, illustrating the manner of applying or removing the slotted saw insert plate in the opening of the table.

Fig. 2 is a fragmentary perspective view of the table of Fig. 1, illustrating the application to the opening in the table, of the shaper assembly or unit embodying the present invention.

Fig. 5 is an enlarged detail view in vertical section and partly in elevation, of the shaper assembly of Fig. 3, with the cutters removed; and Fig. 6 is a top plan view of the table of the machine, illustrating the opening formed therein and the removable shaper unit-supporting insert in place in said opening.

Figure 3:
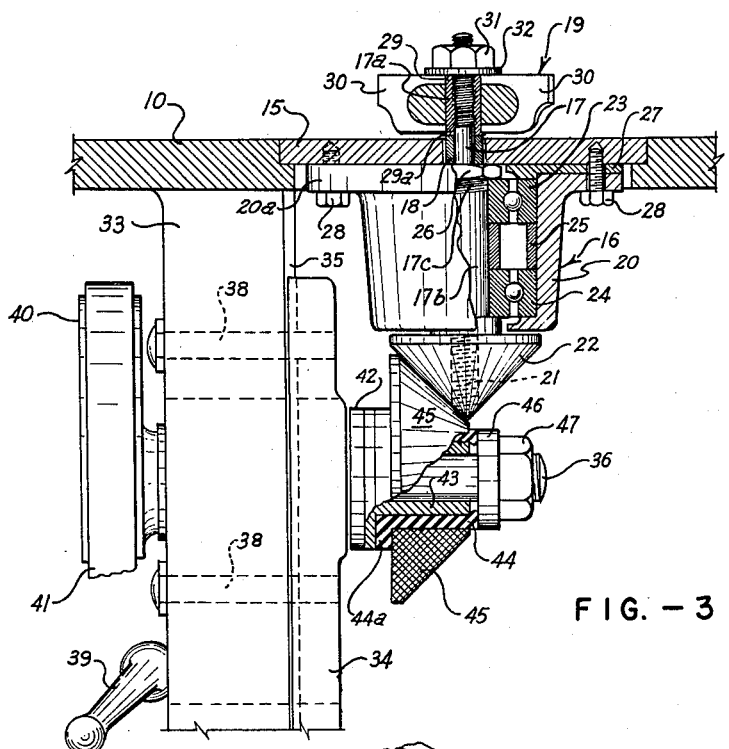
Fig. 3 is a fragmentary vertical sectional view, partly in elevation, illustrating the application of a shaper assembly to a standard table type saw.

Before explaining in detail the present invention, it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Referring now particularly to Figs. 1 and 2 of the drawings, the table of the present machine is illustrated at 10. This table has an opening 11 therein which is of generally oval shape or outline. In Fig. 1, a rotary saw 12 is shown projecting upwardly through opening 11 and particularly through a longitudinal slot 14 in a removable insert 13.

In Fig. 2, a removable insert 15 is shown being inserted in opening 11, said insert 15 carrying the shaper assembly embodying the present invention, said assembly being shown as a whole at 16.

Referring now particularly to Figs. 3 and 5, the shaper assembly 16 of the present invention includes a vertically disposed driven shaft 17 which extends upwardly through a bushing 18 located in an opening in insert 15, the upper end of shaft 17 being threaded at 17a to receive and support the shaper cutting unit, shown as a whole at 19 in Figs. 2 and 3. The unit 16 includes a casing or housing 20 into which the enlarged lower end 17b of driven shaft 17 extends. The shaft portion 17b carries a depending threaded stud 21 onto which is threaded a driven cone-shaped or friction drive member 22. The casing or housing 16 carries upper and lower bearing assemblies 23 and 24, separated by spacers 25. These bearing assemblies provide frictionless rotation for shaft 17. A locking nut 26 engages threads 17c, this nut being located within a space or opening formed in a plate 27 which is interposed between the flange 20a of casing 20 and insert plate 15. The parts are held together and in position upon the insert plate 15 by means of cap screws or bolts 28. Thus, the casing is closed to provide sealed bearing units 23 and 24.

The shaper assembly 16 is completed as shown in Figs. 2 and 3 by applying the cutter assembly 19 to the threaded portion 17a of the driven shaft. This cutter assembly is preferably of standard or conventional construction and includes an internally threaded sleeve 29 carrying cutter 30 which is threaded onto the shaft portion 17a. The lower end of the sleeve is flanged at 29a and rests upon the bushing 18. The unit is held in place upon the driven shaft by a nut 31 which engages a washer 32, see particularly Fig. 3.

The machine includes an upright frame member, standard or wall 33 which carries a vertically adjustable plate 34 having grooves which ride on ribs 35 formed on the standard 33. This plate 34 provides means for supporting the horizontally positioned driving shaft 36 of the machine. The standard 33 is slotted at 37 to receive bolts 38 threaded into the plate 34. Thus, plate 34 carrying driving shaft 36 may be adjusted up and down and held in the desired adjusted position by a standard clamp or locking member having a handle 39, see especially Figs. 2 and 3. This adjustment is usually a feature of a standard table saw. The outer end of driving shaft 36 carries a driven pulley 40 over which a drive belt 41 passes. Belt 41 leads to a suitable source of power (not shown). Belt and pulley impart driving motion to shaft 36.

Referring now particularly to Fig. 3 of the drawings, the improved driving cone assembly of the present invention is illustrated. Shaft 36 is provided with a collar or projection 42 against which a steel bearing or bushing 43 rests, said bushing surrounding said driving shaft 36, as seen. The bushing 43 carries a rubber sleeve-like cushioning member 44 having a base flange or enlarged portion 44a. A cone-shaped body member 45, preferably formed from some suitable non-metallic material such, for example, as asbestos brake lining material, is slipped over the cushioning member or sleeve 44. Thereafter, a steel washer 46 is slipped over the shaft and a nut 47 is tightened down on the threaded portion of said shaft to hold the various parts of the driving cone assembly together and in position upon the driving shaft.

Figure 4:
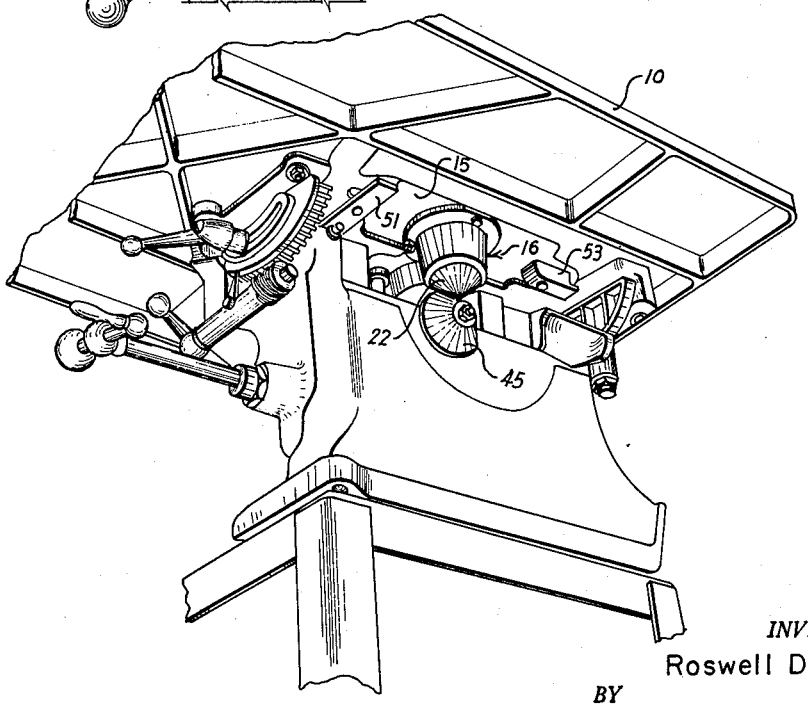
Fig. 4 is a fragmentary perspective view looking beneath the table of the machine of Fig. 3.

It is to be understood that the insert plate 15 should be held rigidly within the opening 11 formed in the machine table 10. For this purpose and as can be seen in Figs. 2, 4 and 6, the table is provided in its under surface with four projecting portions or lugs 50 which extend into the area beneath the opening 11 and which serve to support the plate or removable insert member 15. The insert 15 carries on its under side a rotatable bar or member 51 which rotates about a pivot 52 so that the ends of said bar may be brought into engagement with the under sides of the lugs 50 at one end of the opening 11, namely the back end of said opening. The insert plate also carries on its under side a movable or rotatable locking lug or member 53 which engages the under surface of the table and, with the bar 41, serves to hold the removable insert 15 rigidly in position within table opening 11.

When the machine of the present invention is used as a table saw, the saw 12 of Fig. 1 will be mounted upon the driving shaft 36 in place of the driving cone assembly shown in Figs. 3, 4 and 5. The saw will project upwardly above the table through the slotted removable insert 13.

When it is desired to convert the table saw into a table type shaper, the insert 13 is removed from opening 11 and the saw blade 12 is removed from the driving shaft 36, whereupon the driving cone assembly is applied to said shaft, as clearly seen in Fig. 3. In this case, the insert 15 carrying the shaper assembly 16 and cutter assembly 19, is substituted for insert member 13 and is inserted in the opening 11 in the table and secured in place by the members 51 and 53, above referred to. The driving shaft 36 and the driving cone assembly are now adjusted with relation to the driven cone 22 as desired and when the parts are adjusted, the handle 39 of the clamping device is actuated to hold them in such position. Power is now applied to driving shaft 36 through the medium of pulley 40 and belt 41 to drive the cone 22 and driven shaft 17 to rotate the cutter assembly 19.

From the foregoing, it will be seen that the present invention embraces a machine or apparatus, and an assembly, permitting a table type saw to be quickly and easily converted into a woodworking shaper and to permit reconversion from the shaper to the saw, with ease and facility.

It will be appreciated that by virtue of the present invention, it is possible to purchase a shaper assembly including a driven cone and a driving cone assembly in accordance with said invention which may be installed upon a conventional table saw to quickly convert said saw into a woodworking shaper. Thus, a single machine or apparatus, by virtue of the present invention, may be made to serve the dual function and purpose of a table saw or a table shaper.

Having thus described the invention, what is claimed is:

1. A woodworking machine of the character described, including a drive shaft, means for driving said shaft, a table located above the drive shaft and having an opening formed therein, a removable insert located in said opening, said insert carrying a shaper assembly including a vertically disposed driven shaft and a driven cone mounted upon said shaft, and a driving cone assembly removably mounted upon the driving shaft, said driving shaft and driving cone assembly being adjustable relative to the driven shaft whereby to vary the pressure of the driving cone upon the driven cone.

2. Structure according to claim 1, wherein a slotted insert is substituted for the shaper assembly-carrying insert and wherein a disc saw is substituted for the driving cone on the driving shaft, said saw projecting upwardly through the slotted insert.

3. Structure according to claim 1, wherein the driven and driving cones provide a friction drive means for the shaper assembly.

4. In a woodworking machine of the character described, including a drive shaft, means for driving said shaft, a table located above the drive shaft and having an opening formed therein, and a removable insert located in said opening, said insert carrying a shaper assembly including a vertically disposed driven shaft, the improvement which comprises a driven cone mounted upon the lower end of said shaft, a driving cone removably mounted upon the drive shaft, and means for adjusting the drive shaft and cone relative to the driven shaft and cone whereby to vary the pressure of the driving cone upon the surface of the driven cone, said driving cone being formed from non-metallic material and being cushioned by a rubber sleeve.

5. A woodworking machine including an interchangeable rotary saw and a rotary shaper assembly, comprising a table having an opening therein, a slotted insert removably mounted in said opening, a substitute insert carrying a shaper assembly adapted to be inserted in said opening in place of the slotted insert, said shaper assembly including a driven shaft and a driven cone mounted upon the lower end of said shaft, a driving shaft extending in substantially a horizontal plane and terminating at a point below the opening in said table, means for adjusting the driving shaft toward and away from the opening, a removable disc saw adapted to be mounted upon the driving shaft and projecting upwardly through the slotted insert when the latter is in place in the table opening, and a driving cone adapted to be mounted upon the driving shaft in place of the rotary saw when the shaper assembly and its insert are in place in the table opening, the up and down adjustment of said driving shaft permitting the driving and driven cones to be brought into the proper driving relationship.

6. A woodworking shaper attachment for a standard table type saw, comprising an insert plate, a bearing disposed at the approximate center of said plate, a shaper driven shaft mounted in said bearing and depending below the plate, a detachable housing surrounding a portion of said shaft, spaced bearing assemblies located within the housing and providing frictionless bearing supports for the driven shaft, and a driven cone-like member mounted upon the lower end of said driven shaft and rotatable with the shaft, said cone-like member being adapted to be driven by a generally similar member when the insert plate with its shaper assembly is applied to the table opening of a table saw.

7. Structure according to claim 6, wherein the upper end of the driven shaft is threaded to receive and removably support shaper cutter members.

8. In a woodworking machine including an interchangeable rotary saw and a rotary shaper assembly, comprising a table having an opening therein, a slotted insert removably mounted in said opening, a substitute insert carrying a shaper assembly adapted to be inserted in said opening in place of the slotted insert, said shaper assembly including a driven shaft and a driven cone mounted upon the lower end of said shaft, a driving shaft extending in substantially a horizontal plane and terminating at a point below the opening in said table, means for adjusting the driving shaft toward and away from the opening, and a removable disc saw adapted to be mounted upon the driving shaft and projecting upwardly through the slotted insert when the latter is in place in the table opening, the improvement which comprises a driving cone adapted to be mounted upon the driving shaft of the rotary saw when the shaper assembly and its insert are in place in the table opening, said driving cone having a body portion formed from non-metallic material, and a rubber cushioning member disposed between the non-metallic material and the driving shaft.

9. In a woodworking machine including an interchangeable rotary saw and a rotary shaper assembly, comprising a table having an opening therein, a slotted insert removably mounted in said opening, a substitute insert carrying a shaper assembly adapted to be inserted in said opening in place of the slotted insert, said shaper assembly including a driven shaft and a driven cone mounted upon the lower end of said shaft, a driving shaft extending in substantially a horizontal plane and terminating at a point below the opening in said table, means for adjusting the driving shaft toward and away from the opening, and a removable disc saw adapted to be mounted upon the driving shaft and projecting upwardly through the slotted insert when the latter is in place in the table opening, the improvement which comprises a driving cone adapted to be mounted upon the driving shaft in place of the rotary saw when the shaper assembly and its insert are in place in the table opening, said driving cone comprising a body portion formed from asbestos brake lining, and a rubber cushioning member disposed between the body portion of said cone and the driving shaft.

ROSWELL D. BEARUP.

REFERENCES CITED

The following references are of record in the file of this patent:

UNITED STATES PATENTS

| Number | Name | Date |
| --- | --- | --- |
| 583,678 | Fifield | June 1, 1897 |
| 800,524 | Wetzel | Sept. 26, 1905 |
| 856,563 | Apple | June 11, 1907 |
| 1,298,531 | Manton | Mar. 25, 1919 |
| 1,324,136 | Turner | Dec. 9, 1919 |
| 1,346,031 | Josias | July 6, 1920 |
| 1,589,966 | Hillix | June 22, 1926 |
| 1,618,341 | Howland | Feb. 22, 1927 |
| 2,008,673 | Ocenasek | July 23, 1935 |

FOREIGN PATENTS

| Number | Country | Date |
| --- | --- | --- |
| 253,375 | Germany | Nov. 7, 1912 |
| 400,512 | Great Britain | Oct. 26, 1933 |